United States Patent
Szczepanik et al.

(10) Patent No.: US 11,877,191 B2
(45) Date of Patent: Jan. 16, 2024

(54) RESOURCE MANAGEMENT AND LOGICAL CHANNEL AGGREGATION FOR 5G NETWORKS

(71) Applicant: International Business Machines Corporation, Armonk, NY (US)

(72) Inventors: Grzegorz Piotr Szczepanik, Cracow (PL); Kushal S. Patel, Pune (IN); Sarvesh S. Patel, Pune (IN); Lukasz Jakub Palus, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 17/656,655

(22) Filed: Mar. 28, 2022

(65) Prior Publication Data
US 2023/0308952 A1    Sep. 28, 2023

(51) Int. Cl.
*H04W 28/18*    (2009.01)
*H04W 28/02*    (2009.01)
*H04W 28/08*    (2023.01)
*H04W 84/18*    (2009.01)

(52) U.S. Cl.
CPC ......... *H04W 28/18* (2013.01); *H04W 28/021* (2013.01); *H04W 28/0252* (2013.01); *H04W 28/0983* (2020.05); *H04W 84/18* (2013.01)

(58) Field of Classification Search
CPC ........... H04W 28/021; H04W 28/0252; H04W 28/0983; H04W 28/18; H04W 72/21; H04W 84/18
See application file for complete search history.

(56) References Cited

U.S. PATENT DOCUMENTS

| | | |
|---|---|---|
| 11,075,817 B1 | 7/2021 | Trim |
| 11,178,527 B1 | 11/2021 | Sivakumar |
| 2004/0236547 A1 | 11/2004 | Rappaport |
| 2007/0112951 A1 | 5/2007 | Fung |
| 2015/0131119 A1 | 5/2015 | Narahashi |
| 2015/0235240 A1 | 8/2015 | Chang |
| 2017/0109204 A1 | 4/2017 | Feng |
| 2020/0068647 A1 | 2/2020 | Jha |
| 2022/0046647 A1 | 2/2022 | Cai |

FOREIGN PATENT DOCUMENTS

| | | | |
|---|---|---|---|
| CN | 101800762 A | | 8/2010 |
| CN | 102868643 A | * | 1/2013 |
| CN | 103037109 A | * | 4/2013 |

(Continued)

OTHER PUBLICATIONS

"Patent Cooperation Treaty PCT International Search Report", International application No. PCT/IB2023/052904, International filing date Mar. 24, 2023, dated Jul. 27, 2023, 6 pages.

(Continued)

*Primary Examiner* — Khoa Huynh
(74) *Attorney, Agent, or Firm* — Stephen R. Yoder

(57) ABSTRACT

Resource load balancing for eNodeB includes identifying reduced workload conditions for an underutilized processor (CPU) core and transferring dedicated traffic channel (DTCH) communication to a target CPU core. Upon migrating each DTCH from the selected CPU core, the underutilized CPU core is caused to go into sleep mode, not to receive DTCH request until activated.

20 Claims, 5 Drawing Sheets

(56) References Cited

FOREIGN PATENT DOCUMENTS

| CN | 103037109 A | | 4/2013 |
|---|---|---|---|
| CN | 103532876 A | * | 1/2014 |
| CN | 110662231 A | | 1/2020 |

OTHER PUBLICATIONS

"LTE eNB Tutorial: eNB Architecture", Artiza Networks, accessed on Feb. 21, 2022, 4 pages, <https://www.artizanetworks.com/resources/tutorials/arc.html>.

"Optimizing Network Applications for 5G", Ericsson, Apr. 21, 2017, 4 pages, <https://www.ericsson.com/en/news/2017/4/optimizing-network-applications-for-5g>.

"Windancer—Stairway to . . . Heaven?", Bearers, default Bearers, dedicated Bearers—naughty Bearers | Windancer, Jan. 25, 2010, 10 pages, <https://windancersth.wordpress.com/2010/01/25/bearers-default-bearers-dedicated-bearers-naughty-bearers/>.

Li et al., "Dynamic Resource Optimization Allocation for 5G Network Slices Under Multiple Scenarios", School of Automation Science and Engineering, South China University of Technology, Guangzhou, 510641, China, @2020 IEEE, 6 pages.

Mowla et al., "An energy efficient resource management and planning system for 5G networks", 2017 14th IEEE Annual Consumer Communications & Networking Conference (CCNC), @2017 IEEE, 9 pages.

Shajaiah et al., "An Efficient Multi-Carrier Resource Allocation with User Discrimination Framework for 5G Wireless Systems", arXiv:1506.02448v2 [cs.NI] Jun. 12, 2015, 11 pages.

Shi et al., "Reinforcement Learning for Dynamic Resource Optimization in 5G Radio Access Network Slicing", @2020 IEEE, 6 pages.

* cited by examiner

RESOURCE MANAGEMENT AND LOGICAL CHANNEL AGGREGATION FOR 5G NETWORKS

BACKGROUND

The present invention relates generally to the field of mobile communication networks, and more particularly to logical channel aggregation.

Advancements in the telecommunications industry has been a key enabler for many technologies including artificial intelligence (AI) to succeed by breaking the barrier of various factors such as sedentary operations and lower bandwidth. The fifth generation (5G) technology is expected to serve as a rich enabler to push dependent technologies to an even higher level with a mobility bandwidth of 1 GBPS and the convergence of IoT (internet of things) device access. The 5G network is expected to become a part of the connected community through various features including observing the surroundings, reasoning an answer, making inferences, and taking thoughtful actions.

In a 5G telecom network, the medium access control (MAC) sublayer of new radio (NR) interface provides services to the radio link control (RLC) layer where controls are provided in the form of logical channels. These logical channels are virtualized communications network interfaces that are used to transfer IO commands (network data packets) and control instructions over a radio interface and 5G fixed-access network. A logical channel is defined by the type of information it carries and is generally differentiated as a control channel, used for transmission of control and configuration information; or as a traffic channel, used for the user data. The 5G radio technology allows for creation of multiple logical channels over a single radio bearer network using the 5G network slicing models. These channels are used to carry a specialized traffic from user equipment device to the 5G network. As multiple channels are created from a single device to the 5G network, the channels deliver parallelism in the packet transmission as well as reduce the exclusive locking of the 5G network resources that provide performance benefits.

Smarter mobile applications are gaining many performance benefits from 5G logical channel-based parallelism by creation of multiple channels from the user equipment to the 5G network. Because the logical channels are created over a radio interface, the E-UTRAN (evolved universal terrestrial radio access network) Node B, abbreviated as eNodeB, in the cell is responsible for management of the DTCH-over-radio interface (Dedicated Traffic CHannel). The eNodeB allocates resources to the DTCH based on the nature of the resource, e.g. S1 and radio interfaces. Parameters are negotiated at the time of channel creation. The eNodeB manages the logical channel over the NR interface and connects with the serving gateway (S-GW) of the 5G telecom network and transmits the packets collected from all the channels using compression, alignment, and multiplexing techniques. The data sending and the reception in a bearer channel are transported by an S1 bearer between an S-GW and an eNodeB, and by a radio bearer between user equipment and an eNodeB.

SUMMARY

In one aspect of the present invention, a method, a computer program product, and a system for resource management in a fifth generation (5G) network includes: monitoring a platform queue in a 5G network for a dedicated traffic channel (DTCH) request; responsive to receipt of a DTCH request, identifying a plurality of processor cores of an evolved-universal-terrestrial-radio-access-network Node B (eNodeB) to which the DTCH request may be assigned; determining a utilization level of each processor core; identifying a sub-set of processor cores having utilization levels below a threshold value; for each processor core identified as underutilized, determining logical channels allocated to the underutilized processor cores; and reallocating the logical channels to a set of active processor cores of the plurality of processor cores, the set of active processor cores having utilization levels above the threshold value.

In another aspect of the present invention, a method, a computer program product, and a system for resource management in a fifth generation (5G) network includes: collecting utilization levels of the plurality of processor cores for a specified operation timeframe; and comparing the utilization levels of each processor core to identify an overall balancing among processor cores of the eNodeB. Identifying a sub-set of processor cores is performed responsive to the overall balancing among the processor cores being outside a pre-defined tolerance.

DETAILED DESCRIPTION

Figure 1:
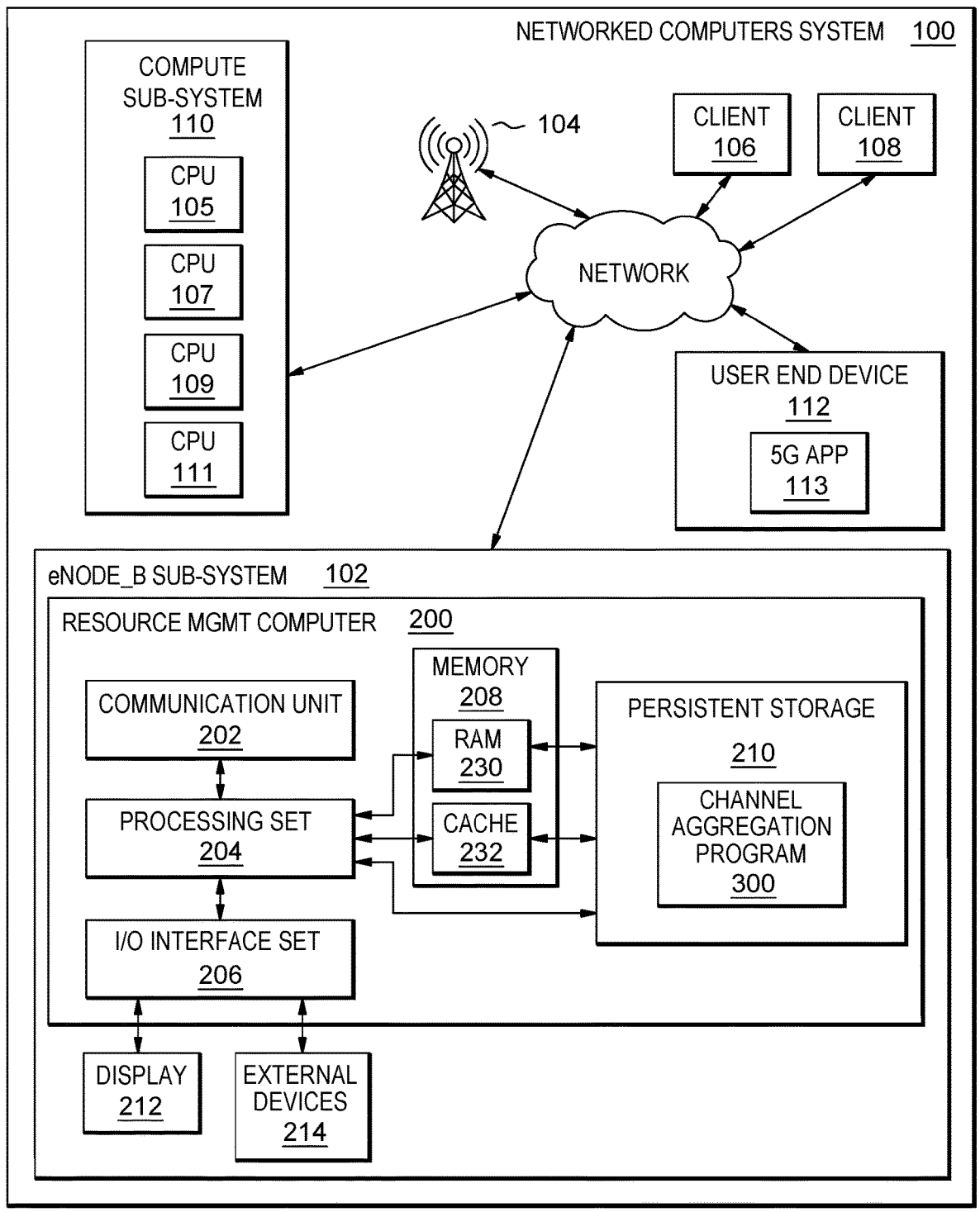
FIG. 1 is a schematic view of a first embodiment of a system according to the present invention.

Resource load balancing for eNodeB includes identifying reduced workload conditions for an underutilized processor (CPU) core and transferring dedicated traffic channel (DTCH) communication to a target CPU core. Upon migrating each DTCH from the selected CPU core, the underutilized CPU core is caused to go into sleep mode, not to receive DTCH request until activated. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: e-NodeB sub-system 102; e-NodeB antenna sub-system 104; client sub-systems 106, 108; compute sub-system 110; user end (UE) device 112; 5G application 300; communication network 114; resource management computer 200; communication unit 202; processor set 204; input/output (I/O) interface set 206; memory device 208; persistent storage device 210; display device 212; external device set 214; random access memory (RAM) devices 230; cache memory device 232; and channel aggregation program 400.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Channel aggregation program 300 operates to monitor dedicated traffic channel requests for identifying candidate processor cores for assigning the request while operating to balance an overall workload of the available processor cores by determining when to aggregate logical channels during conditions of underutilized processor cores such that certain processor cores may be placed in sleep mode.

Some embodiments of the present invention recognize the following facts, potential problems and/or potential areas for improvement with respect to the current state of the art: (i) in practice, the number of logical channels at eNodeB is dependent upon the number of resources in the eNodeB; (ii) each logical slice of over-the-radio interface (DTCH) consumes a specific amount of resources at the user equipment (UE) side as well as at the eNodeB side; (iii) memory and processing compute needs at the UE device are not a concern in general because the amount of processing power compared to the number of active applications is balanced in most cases; (iv) managing the resources at the eNodeB can be challenging because of the large number of devices that are often connected to the eNodeB in the small cell of 5G network; and/or (v) the driving factor impacting amount of parallelism is generally the logical slicing and allocation of resources at eNodeB While it may seem that multiple logical channels can be created over radio interfaces to gain the benefits of parallel processing across multiple radio bearer channels, in practice the number of logical channels at eNodeB is dependent upon the number of resources in the eNodeB. Each logical slice of over-the-radio interface (DTCH, Dedicated Traffic CHannel) consumes a specific amount of resources at the user equipment (UE) side as well as at the eNodeB side. Managing the resources at eNodeB can be challenging because of the number of devices that need to be connected to the eNodeB in the small cell of 5G network. The driving factor impacting the amount of parallelism is generally the logical slicing and allocation of resources at eNodeB.

The eNodeB usually partitions resources into multiple sets where each set includes computation, memory, and storage space so that it can be treated independently while processing the DTCH connection and the packet workflow across the small cell eNodeB and RAN (radio access network) traffic.

The 5G core access and mobility management function (AMF) in the network function virtualization layer receives the connection and session information from the UE and is responsible for handling connection and mobility management tasks. The AMF is in charge of managing handovers between eNodeB's within the next-generation radio access network (NG-RAN). Handovers normally referred to as the X2 handover are termed an Xn handover in the 5G network.

When any new device or application logs into the 5G network and initiates a device handshake, the device attempts to create DTCH(s) based on certain requirements. It could be a bare metal DTCH where the operating system (OS) of the UE device creates the DTCH and all the traffic is derived through the list of channels created by OS layer in round-robin fashion. Or it could be application-driven logical channels where the application controls the channel and packet flow parameters. Once the DTCH_CONNECT is initiated by the UE instance, the eNodeB receives the signal and allocates the resources to the logical channel where it is permitted for creation. These resources are memory, CPU, and storage resources that are dedicatedly allocated to the DTCH and the CREATE_SUCCESS will be sent to the UE device so that the upcoming packet flow can be started using new channel IDs over the RAN.

In this case, once the resources are allocated, they cannot be changed during runtime of the logical channel. When the logical channel is active, the resources need to be the same as they are assigned at the time of DTCH_CREATE activity at eNodeB. One of the approaches to change the resources is to send the disconnect to the logical channels so that the initiator device and re-attempt channel creation at eNodeB maps the channel to new resources set.

For example, where the logical channels are created during a peak workload period on the eNodeB, the current workload understanding may lead to the load balancer in the eNodeB assigning respective resources to meet the requirement of DTCH and it is created for further access. Inevitably the workload distribution will change from the peak workload period to a reduced workload period. In that case, the workload balancing engine takes care of resource allocation internally so that the thrashing and overloading can be avoided.

During relatively lower workload periods such as overnight, a greatly reduced packet workload may be observed at the eNodeB. Additionally, during this reduced workload period, many applications may have closed their logical channels such that each of the resource sets at the eNodeB has very few allocations active. Accordingly, there are relatively fewer DTCH connections that are active at the eNodeB level. The DTCH connections are distributed across all the resource sets based on their creation timelines. Because they are created at different times during the day, with different point-in-time workload situations, and with altogether dissimilar requirements, they are mapped to different resource sets and operate from individual sets in the eNodeB.

The resulting situation is that multiple resource sets are serving a relatively small DTCH workload which can be aggregated to a single resource set or at least to a smaller number of resources-sets at the eNodeB. Even if all the CPUs are tagged with fewer channels, they will continue to be operated at their regular operating clock speed and consume more power at eNodeB than may be necessary. The power consumed by the CPUs having relatively fewer channels can be saved if the DTCH's are allocated to a single CPU core allowing the remaining cores to sleep while the workload is lower than what is needed to use each of the CPU cores. A problem arises in that each DTCH needs to be tagged with a particular CPU core. Some embodiments of the present invention provides a mechanism to handle the DTCH processing for aggregation during reduced workload periods to reduce power consumption and unnecessary processing at the eNodeB.

Figure 2:
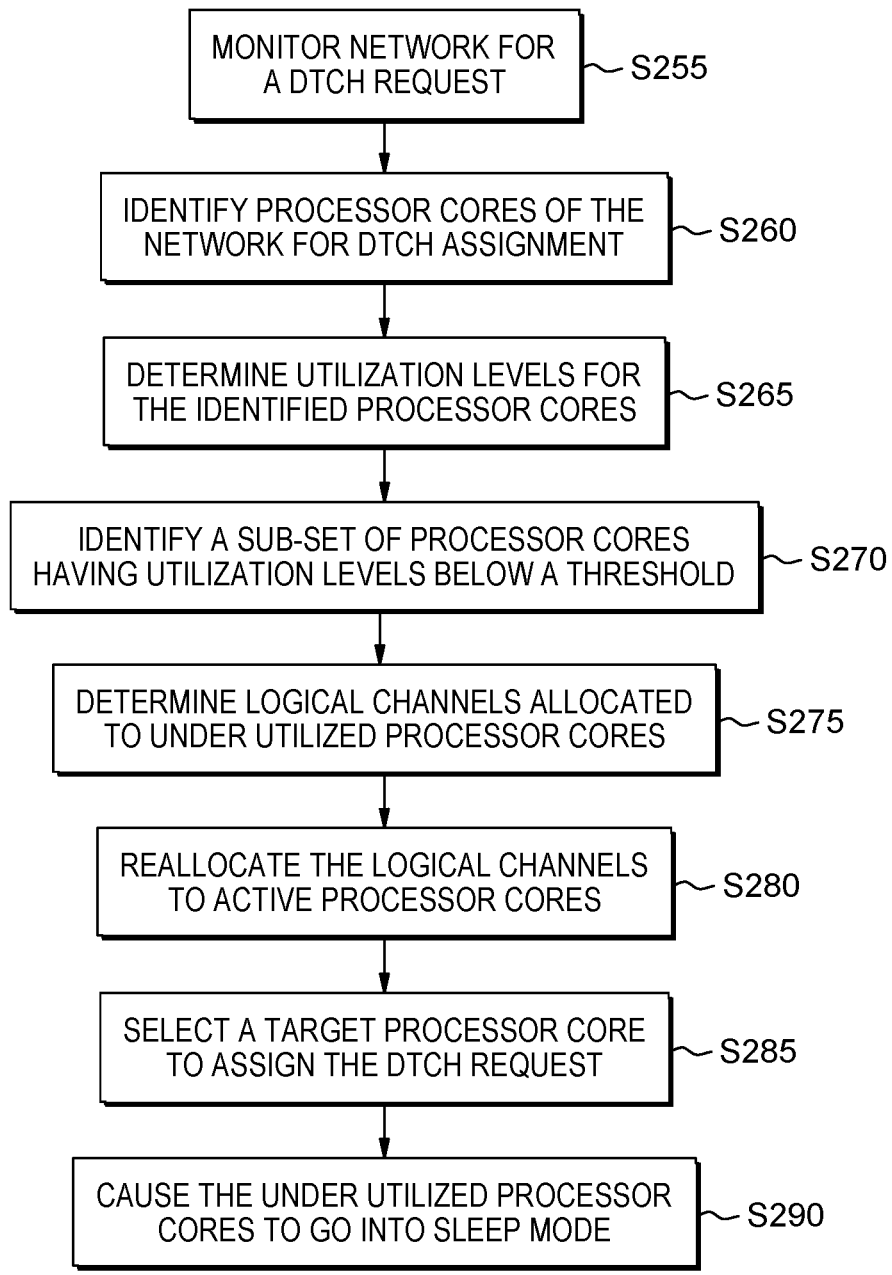
FIG. 2 is a flowchart showing a method performed, at least in part, by the first embodiment system.
Figure 3:
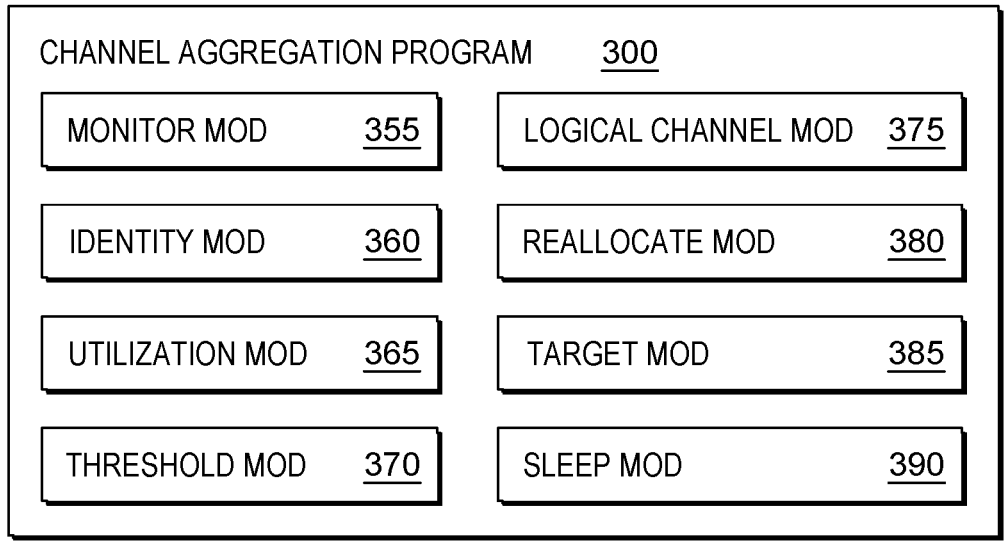
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where monitor module ("mod") 355 monitors a platform queue in a 5G network for a DTCH request. In this example, user end device 112 requests a DTCH with the 5G network, which drives connections to compute sub-system 110 having multiple processor cores CPU 105, CPU 107, CPU 109, and CPU 111. As described in more detail below, some embodiments of the present invention operate an eNodeB polling thread to poll for incoming messages over the platform queue.

Processing proceeds to step S260, where identify mod 360 identifies a plurality of processor cores of an eNodeB to which the DTCH request may be assigned. Upon detection of a DTCH request, an appropriate processor core should be selected to satisfy the request. In this example, the identify module identifies the set of processor cores in computer sub-system 110 as candidate CPUs for making a selection.

Processing proceeds to step S265, where utilization mod 365 determines a utilization level of each processor core. In this example, the utilization levels of each CPU in compute sub-system 110 are compared to each other for determining a workload balance condition, or overall balancing, of the work performed by the processor cores. The utilization level is based on data collected over a pre-defined duration of time, or specified operation timeframe. When identifying utilization levels of the processor cores, it may be recognized that the overall balancing among the processor cores is outside of a pre-defined tolerance for balance. Where overall balancing refers to relative percentages of overall workload performed by each processor core, the pre-defined tolerance for balance identifies a maximum above-average percentage of workload that may be performed by a single processor core. For example, a single core may be performing a particular percentage of the total workload, which amounts to a percentage above the pre-defined performance range for the processor. In some embodiments a balancing range is provided in a lookup table for each processor according to processor capacity.

Processing proceeds to step S270, where threshold mod 370 identifies a sub-set of processor cores having utilization levels below a threshold value. When the utilization levels are determined for each identified processor core, there may be a sub-set of processor cores identifiable as being under-utilized based on a given threshold value. As discussed in more detail below, some embodiments of the present invention compare utilization levels for the identified processor cores to determine which, if any, of the processor cores have a workload below a threshold level based on differential policy for workloads. Where certain processor cores have utilization levels below the threshold level, they are associated with a sub-set of processor cores for further processing to realign logical channel allocations and eventually cause the underutilized processor cores to go into sleep mode. In cases where no processor core is identified as being underutilized processing may proceed to assign the DTCH request to a target processor core.

Processing proceeds to step S275, where logical channel mod 375 determines logical channels allocated to the underutilized processor cores. According to some embodiments of the present invention, the identified underutilized processor cores undergo a validation process to validate the status of "underutilized" prior to taking the reallocation steps described herein. Upon identifying a set of underutilized processor cores, the logical channels allocated to the cores are identified. In this example, the identified logical channels are mapped via user devices such as clients 106, 108 and user end device 112 to the underutilized processor cores.

Processing proceeds to step S280, where reallocate mod 380 reallocates the logical channels to active processor cores of the plurality of processor cores. The active processor cores are those processor cores having utilization levels above the threshold value. During reallocation, the logical channels of the user devices may be disconnected from the respective underutilized processor core and reconnected according to an allocation scheme to optimize resource utilization.

Processing proceeds to step S285, where target mod 385 selects a target processor core from the set of active processor cores based on the target processor core having a utilization level above the threshold value. The target processor core being the processor core to which the DTCH request is to be routed and to which all further traffic for the DTCH request is routed.

Processing ends at step S290, where sleep mod 390 causes the underutilized processor cores to go into sleep mode. Having disconnected logical channels from the processor cores having been identified as underutilized cores, the processor cores are put into sleep mode until increase workload demands their return to use.

Figure 4:
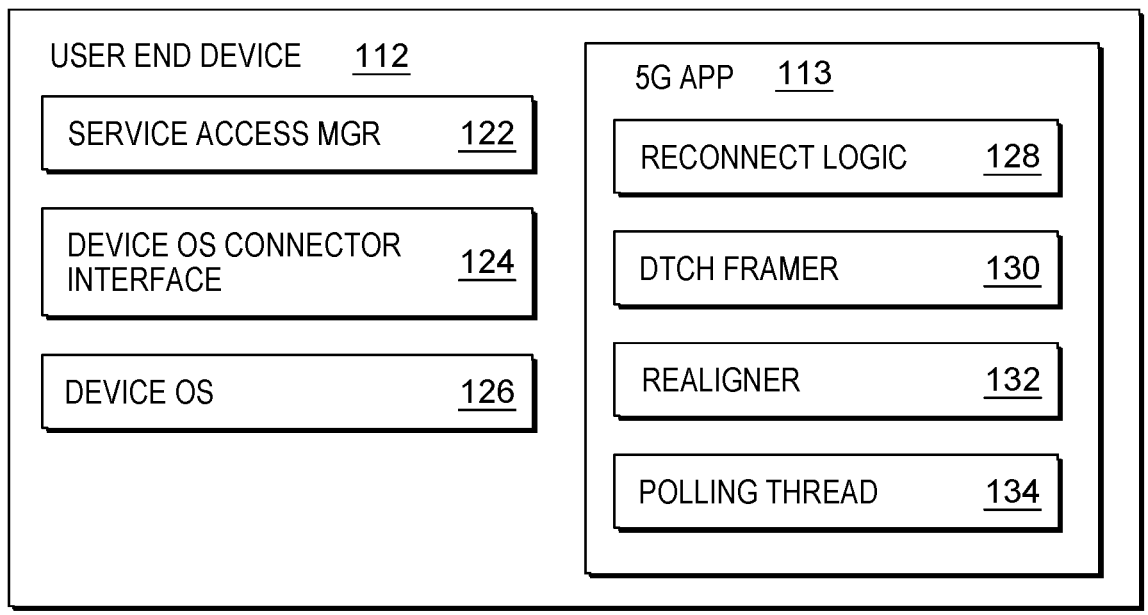
FIG. 4 is a schematic view of a machine logic (for example, software) portion of an user end device according to the first embodiment system.
Figure 5:
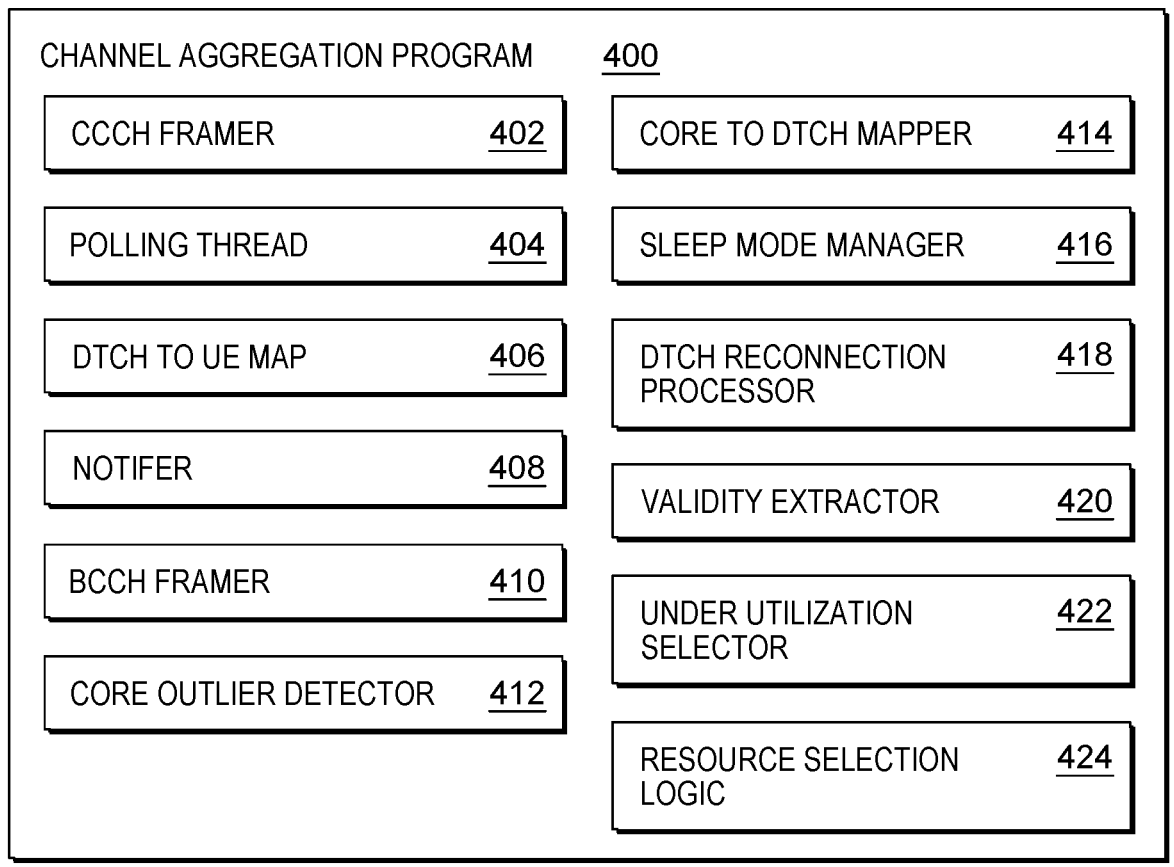
FIG. 5 is a schematic view of a machine logic (for example, software) portion of an eNodeB according to the first embodiment system.
Figure 6:
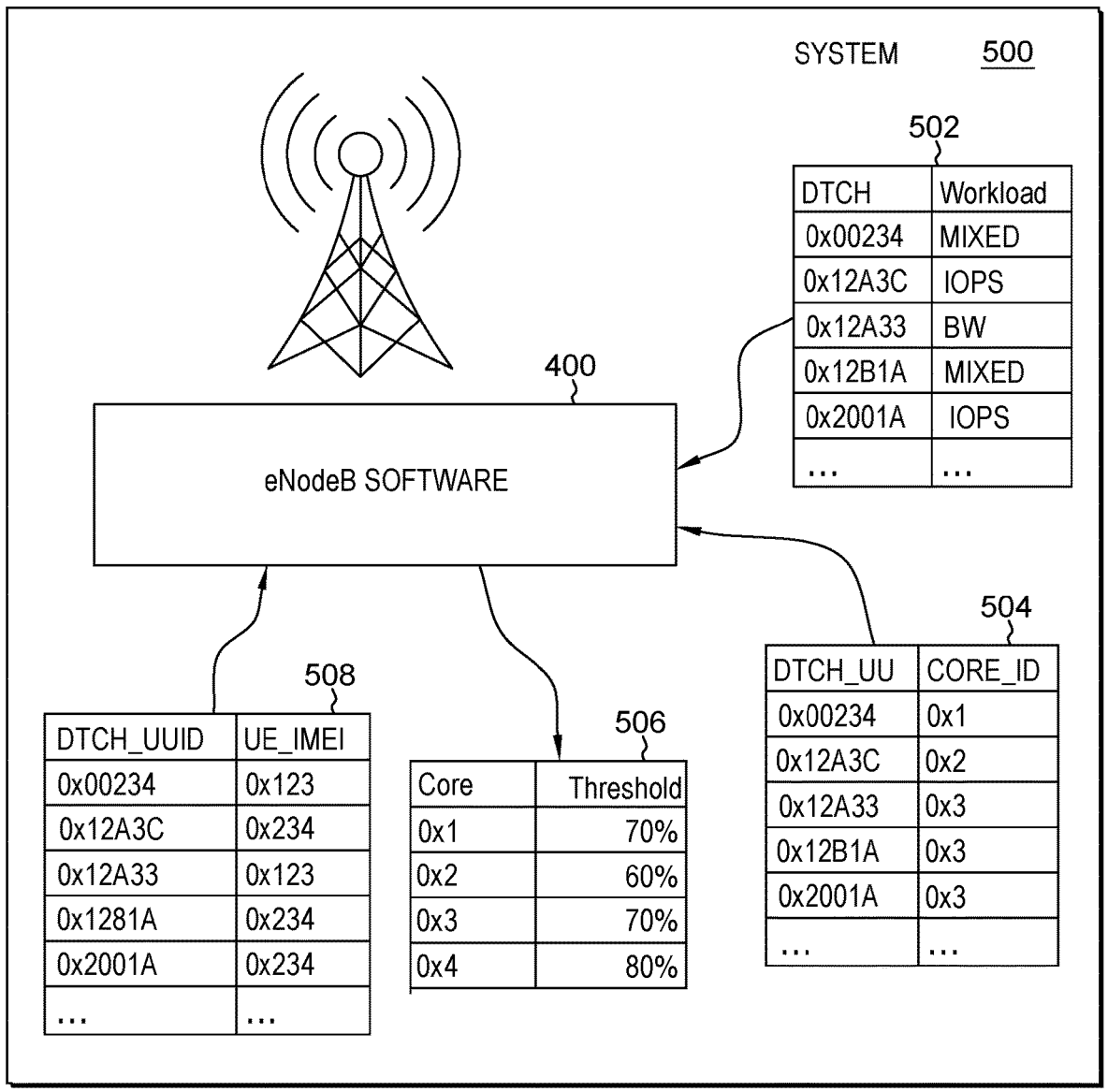
FIG. 6 is a screenshot view showing information that is generated by and/or helpful in understanding embodiments of the present invention.

Further embodiments of the present invention are discussed in the paragraphs that follow and with reference to FIGS. 4-6.

FIG. 4 shows further details of the software in user end (UE) device 112, specifically 5G application 113. The UE device includes service access manager module 122, device OS connector interface 124, and device operating system 126. Further, the 5G application includes: reconnect logic 128; DTCH framer module 130; realigner module 132; and polling thread module 134.

FIG. 5 shows machine logic portions of the channel aggregation program 400, which may operate in system 100 similar to program 300, see FIG. 1. Many of the operations presented in the discussion that follows are performed by the 5G application of the UE device and the channel aggregation program, which includes: common control channel (CCCH) framer module 402; polling thread module 404; DTCH to UE map module 406; notifier module 408; broadcast control channel (BCCH) framer module 410; core outlier detector module 412; CPU core to DTCH mapper module 414; sleep mode manager 416; DTCH reconnection processor module 418; validity extractor module 420; underutilization selector module 422; and resource selection logic 424.

Some embodiments of the present invention are directed to working with the 5G eNodeB resource allocator and load balancing engine for providing an optimal way to allocate the eNodeB resource allocation when the channels are not expected to be active for a longer duration of time.

Some embodiments of the present invention are directed to a mechanism for monitoring eNodeB's resources set to the number of logical channels created to each resources sets and maps them with their related workloads. When any new DTCH request arrives at the eNodeB, the resource load balancer engine is activated to select the CPU core to which the upcoming DTCH request can be attached. Upon selecting the CPU core, the remaining packets delivery and receptions are handled by the allocated CPU core. It should be noted that this discussion considers only the CPU cores at the eNodeB that are attached to a DTCH. The reality for the eNodeB is that the memory and storage resources are also tagged to a DTCH to get physically contiguous memory and storage region for faster IO workload performance of the channel.

Some embodiments of the present invention are directed to a monitoring daemon that monitors workload and logical channels allocated to each CPU core and that validates the possibility of aggregation of the channels in the eNodeB. The channel aggregation policies are adhered to when changing the CPU core of the logical radio slice.

For example, if there were ten logical channels that were allocated to each CPU core of the eNodeB at the time of connection establishment and according to current workload balancing. After a few hours, the workload is expected to be reduced because of reduced device utilization and a corresponding reduction in accesses via the eNodeB. According to some embodiments of the present invention, a polling thread in the eNodeB polls for the amount workload and a count of logical channels attached to each CPU core. If it is observed that there are some CPU cores having only three DTCH attachments, the daemon triggers an aggregation signal to an aggregator unit. A substantial reduction in DTCH attachments is determined using various techniques known in the art including: (i) a percentage reduction from maximum daily count, (ii) a threshold number of attachments below the maximum daily count, and/or (iii) a threshold number below an average daily attachment count. Once the aggregator unit receives an optimization signal suggesting a substantial reduction in workload, the CPU cores are identified that have a substantially reduced workload and a process is implemented to reduce the number of CPU cores operating according to a target operating level or threshold workload requirement.

Existing timelines are imposed on the collected workload and attachment logic. The migration decision is made by the aggregator engine according to an analysis of the collected data. For example, the typical access pattern between the hours of 2 AM to 5 AM local time is substantially less than other times of the day. It is further noted that the three hours of substantially lower workloads is a considerable amount of time for energy conservation. The aggregator unit includes a decision-making engine that collects actionable data and analyzes the possibilities for CPU core workload aggregation. Where the conditions are favorable for DTCH aggregation the decision to migrate will be implemented where some of logical channels from a certain set of CPU cores will be migrated to one or more other CPU cores. According to some embodiments of the present invention, each CPU core of the eNodeB is examined for their related workload and any underutilized CPU cores are selected for migrating their corresponding logical channels to a target set of CPU cores. The set of CPU cores are selected for migrating their targeted workload when the DTCH is migrated to a selected CORE_ID of a target CPU core. The preparation of DTCH_UUID and new CPU_CORE mapping is generated to free up some of the resources to reduce usage. In this way, the eNodeB has the optimal aggregation execution map that is generated having mapped the DTCH list and their respective new resource locator. The execution map is saved in the CP-data structures.

Because the resources attached to DTCH cannot be changed during runtime, they need to be reconnected from their respective initiators. Reconnection is achieved by the command DTCH_REMOTE_DISCONNECT being sent to all the candidate channels and they will be disconnected from eNodeB. Responsive to the DTCH_REMOTE_DISCONNECT being received by the UE device, the UE attempts DTCH_RECONNECT request to eNodeB. The UE device recognizes that there is a specific reason the eNodeB has disconnected the signal, so an attempt to reconnect is automatically attempted.

The DTCH_RECONNECT was expected at the eNodeB because the aggregator has specifically disconnected the sessions to reallocate the resources. Accordingly, when the DTCH_RECONNECT message is received by the eNodeB, the aggregation execution map is parsed to determine which resources need to be allocated for the DTCH_RECONNECT process. In this example, the usual workload balancer is bypassed because the information is already pre-computed before disconnecting the sessions. The resources are allocated to perform packet IO according to the execution map and the UE resumes the connection to the eNodeB. When the process is complete, each underutilized, or candidate, CPU core has no DTCH connected. Once all the sessions to selected resources are disconnected, the aggregator causes the resources to go into sleep mode for energy saving and/or maintenance.

In the case where the resources are transitioned to power saving sleep mode, the overall energy requirement of eNodeB is minimized without compromising the network performance in 5G. Further, as the resources are moved to sleep mode, all further DTCH_CONNECTION will be processed by active resources until they reach to a certain threshold workload level or other triggering event occurs, such as predicted increased workload [Inventors: are there other situations where the sleeping resources will be activated besides reaching a threshold workload level?]. When the active resources reach to an optimal, or target, workload level, the inactive resources are activated from sleep mode so that a desired level of network performance can be maintained.

Some embodiments of the present invention are implemented with the following process steps beginning at the eNodeB polling thread by polling for any incoming message over platform queue by:
  a. If the message received over in-band message queue platform, then:
    i. Check the opcode of the SIGNAL message;
    ii. If the OPCODE is DTCH_REMOTE_DISCONNECT opcode, then:
      1. Initiate DTCH disconnect procedure in the eNodeB;
      2. Poll for the completion;
      3. If UE device's resources are freed up, then:
        a. initiate DTCH_RECONNECT operation;
        b. Wait for operation to complete; and
    iii. Else, invoke common control channel (CCCH) control frame decoder and related functions as usual; and
  b. Else, ignore and drop the padding signaling data.

According to some embodiments of the present invention, processing may proceed from the eNodeB polling thread to a process at the eNodeB subsystem as follows: (i) upon reception of any DTCH_REMOTE_DISCONNECT message from Access and Mobility Management Function (AMF), or upon reception of any CORE_REALIGNMENT message from Network Virtualization Function instance at eNodeB:
  a. Detect the DTCH_IDs (or BEARER_IDs) to be DISCONNECTED as part of local workload adjustment;
  b. Identify the resource set of DTCH_ID (or BEARER_ID) which need to be deallocated and resources need to free up;
    i. If the DTCH_ID (or BEARER_ID) is a set of BEARERs then, perform above step for all the BEARER_IDs that need to be deallocated;
  c. PROCESS_DEALLOCATE (DTCH_ID [ ]);
  d. Send the message to Network Function Virtualization for DEALLOCATE (DTCH_LIST);
  e. Send the message for REMOTE_DTCH_DISCONNECT (DTCH_LIST) to Access and Mobility Management Function (AMF) which then sent to UE devices;
  f. Send the ACK list of DTCH_ID [ ] to the Notification Manager; and
  g. Notification Manager sends the CCCH frames with REMOTE_DTCH_DISCONNECT message to UE device, then the UE device will detach the sessions and attempt recreation.

Some embodiments of the present invention initiate the CPU core and resource utilization collection daemon by the following process: (i) for all the CPU cores and associated resources at eNodeB, collecting the utilization stats for specified timelines; (ii) locating the balancing of the cores a) for the all the cores in the eNodeB, match the utilization to identify overall balancing of eNodeB; and b) if the workload detected are below the THRESHOLD_LOW based differential policy wherein if certain cores are utilized very low extent and detected as outlier because of low workload, then sending the list of outlier cores to send round of validation; and (iii) collecting all the outlier cores and memory and storage resource-sets for further processing.

Some embodiments of the present invention perform the following process step after creating a RESOURCE_ARRAY:
  1) If there are outlying cores found in the system:
    a) Receive the list of outlier core list;
    b) Collect the core-based threshold values from config tables (or differential values);
    c) For each item in the core list, validate it for under-utilization threshold;
    d) For each core in the system, which are not part of pre-detected underutilized cores:
      i. If the core utilization is in the range of optimal workload threshold, then append the list of OPIMAL_CORE [ ]: or
      ii. Select the DTCHs that are mapped to the UNDERUTILIZED_CORE list and append the list of DTCH_REALIGNER [ ];
    e) For each core in the list of OPTIMAL workload list:
      iii. Validate the port alignment workload; and
      iv. If port alignment workload is also in the OPTIMAL THRESHOLD limits, then validate the DTCH list and make the conformation for migration; and
    f) Trigger the ALIGNMENT SIGNAL to Notification Manager.

2) Upon reception of Notification Request with ALIGNMENT SIGNAL message:
   a) Locate the UE to DTCH map to identify user devices that need to reallocate the logical channels;
   b) For all the UEs in the identified list, prepare the broadcast control channel (BCCH) frames with device international mobile equipment identity (IMEI) identifier and respective DTCH unique UUID (universally unique identifier) that need reallocation; and
   c) Send the BCCH frames with the created padding data.
3) Upon reception of DTCH_RECONNECT request:
   a) Traverse pre-created config and allocation policy;
   b) Locate for the DTCH UUID for new connection request;
   c) Select the resource-set based on pre-computed resource allocation;
   d) Allocate the resources for DTCH_CONN_REQ; and
   e) Send CREATE_SUCCESS message over CCCH frames via Radio notification manager.
4) When all DTCHs are moved to another resource-set, then:
   a) Put the resources with no DTCH on sleep mode.
   b) Start polling for activation signal and activating the resources where needed.
5) When new DTCH requests come to eNodeB:
   a) Allocate the resources from CURRENT_ACTIVE list; and
   b) If any of the CURRENT_ACTIVE resources are overloaded, then:
      i) Attempt rebalancing between the CURRENT_ACTIVE sets; or
      ii) If none of CURRENT_ACTIVE element is ready to accept the workload, then trigger ACTIVATE_RESOURCES for any of the resource-set based on defined policy.

Some embodiments of the present invention perform the following process flow at the UE device upon receipt of the DTCH_REMOTE_DETACH message over BCCH and if the UE (or other entity) is still interested to create logical channels per device requirement:
   i) Save the DTCH UUID before disconnecting (This will be used to give knowledge to eNodeB about channel workload);
   ii) Send the DTCH_DISCONNECT (or BEARER_DISCONNECT) to the target via control instruction transfer of MAC (Media Access Control) protocol over Radio interface;
   iii) Wait for SUCCESS and continue with next step when SUCCESS message is received; iv) Create the DTCH_CONNECT message with workload data of OLD_DTCH_UUID;
   v) Send the DTCH_CONNECT (or BEARER_CONNECT) to the target via control instruction transfer of MAC (Media Access Control) protocol over Radio interface; and
   vi) Poll for SUCCESS message and if a SUCCESS message is not received in a timely manner, then retry DTCH_CONNECT (or BEARER_CONNECT) until a retry timeout occurs.

FIG. 6 shows data collected by eNodeB software 400 of system 500. The data includes workload parameters 502; CPU core mapping 504; CPU core usage report 506; and UE device IMEI identifier with respective DTCH unique UUID for reallocation report 508.

Some embodiments of the present invention are directed to a mechanism to detect the gatherings and allocation of network resources at eNodeB and management of logical channels to get the maximum performance and energy benefits which is addressed in this invention.

Some embodiments of the present invention are directed to cognitive enablement for a requirement calculation and allocating resources based on the QCI and estimated workload for energy conservation in 5G network.

Some embodiments of the present invention are directed to aggregating demand to as few CPU cores as possible in a 5G network to optimize resource utilization.

Some embodiments of the present invention are directed to working with the eNodeB resource allocator and load balancing engine of a 5G network to provide an optimal way to allocate the eNodeB resources when the channels are not expected to remain active for a relatively long duration of time.

Some embodiments of the present invention are directed to resource optimization in a 5G network including process steps: monitoring a set of resources of eNodeB and a plurality of logical channels created to handle workloads; upon detecting a new request for a Dedicated Traffic Channel (DTCH request), activating a resource load balancer engine and using it to select a CPU core to which the new DTCH request can be assigned; routing all further traffic for the respective DTCH request via the assigned CPU; and monitoring workload and logical channels allocated to each CPU core and validating a possibility of aggregation of the channels in the eNodeB via a monitoring daemon.

Some embodiments of the present invention provide a precise system of load balancing of workload across cores and taking into account aggregations options.

Some embodiments of the present invention are directed to optimization of existing devices in a 5G network including a eNodeB subsystem.

Some embodiments of the present invention are directed to a process, which upon detecting a new request for a Dedicated Traffic Channel (DTCH request), includes the step of activating a resource load balancer engine and using it to select a CPU core to which the new DTCH request can be assigned.

Some embodiments of the present invention are directed to routing any further traffic for a respective DTCH request via an assigned CPU.

Some embodiments of the present invention are directed to monitoring workload and logical channels allocated to each CPU core and validating a possibility of aggregation of the channels in the eNodeB via a monitoring daemon.

Some embodiments of the present invention are directed to resource management in a 5G network including process steps: monitoring a set of CPU cores of eNodeB and a plurality of logical channels created to handle workloads of the 5G network; upon detecting a new request for a Dedicated Traffic Channel (DTCH request), activating a resource load balancer engine and using it to select a CPU core to which the new DTCH request can be assigned; routing all further traffic for the respective DTCH request via the selected CPU core; and monitoring workload and logical channels allocated to each CPU core and validating a possibility of aggregation of the channels in the eNodeB via a monitoring daemon.

Some embodiments of the present invention may include one, or more, of the following features, characteristics and/or advantages: (i) works in energy saving of 5G telecommunications network; (ii) when implemented in a telco provider, a significant energy savings is possible; (iii) helps in infrastructure cost reduction for telco-provider implementation; (iv) facilitates optimization of channel processing logic in multicore dedicated resource allocating architecture; (v) enables efficient IO processing capability in multi-shared architectures of eNodeB; (vi) enables IaaS/PaaS service providers to provide more accurate and optimal real-time data placement using 5G service orchestration; (vii) provides ability to push the data based on the realistic situations by self-adjusting the monitoring levels based on real-time information utilization; and/or (viii) provides for efficient monitoring of resources to reduce non-related content and drive dynamic content delivery.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for resource management in a fifth generation (5G) network, the method comprising:
monitoring a platform queue in a 5G network for a dedicated traffic channel (DTCH) request;
responsive to receipt of a DTCH request, identifying a plurality of processor cores of an evolved-universal-terrestrial-radio-access-network Node B (eNodeB) to which the DTCH request may be assigned;
determining a utilization level of each processor core;
identifying a sub-set of processor cores having utilization levels below a threshold value;
for each processor core identified as underutilized, determining logical channels allocated to the underutilized processor cores; and
reallocating the logical channels to a set of active processor cores of the plurality of processor cores, the set of active processor cores having utilization levels above the threshold value.

2. The method of claim 1, further comprising:
validating underutilization status of each processor core of the sub-set of processor cores.

3. The method of claim 1, further comprising:
selecting a target processor core from the set of active processor cores based on the target processor core having a utilization level above the threshold value, the target processor core being the processor core to which the DTCH request is to be routed; and
routing all further traffic for the DTCH request vis the target processor core.

4. The method of claim 1, further comprising:
upon reallocating the logical channels from the underutilized processor cores, causing the underutilized processor cores to go into sleep mode.

5. The method of claim 1, further comprising:
responsive to reallocating the logical channels to the set of active processor cores, monitoring workload levels and logical channels allocated to the set of active processor cores.

6. The method of claim 1, wherein determining the logical channels allocated to the underutilized processor cores includes:
identifying user devices allocated logical channels to the underutilized processor cores via a user-device to DTCH map.

7. The method of claim 1, wherein determining the utilization level includes:
collecting utilization levels of the plurality of processor cores for a specified operation timeframe; and
comparing the utilization levels of each processor core to identify an overall balancing among processor cores of the eNodeB; and
wherein the identifying a sub-set of processor cores is performed responsive to the overall balancing among the processor cores being outside a pre-defined tolerance.

8. A computer program product comprising a computer-readable storage medium having a set of instructions stored therein which, when executed by a processor, causes the processor to perform resource management in a fifth generation (5G) network by:
monitoring a platform queue in a 5G network for a dedicated traffic channel (DTCH) request;
responsive to receipt of a DTCH request, identifying a plurality of processor cores of an evolved-universal-terrestrial-radio-access-network Node B (eNodeB) to which the DTCH request may be assigned;
determining a utilization level of each processor core;
identifying a sub-set of processor cores having utilization levels below a threshold value;
for each processor core identified as underutilized, determining logical channels allocated to the underutilized processor cores; and
reallocating the logical channels to a set of active processor cores of the plurality of processor cores, the set of active processor cores having utilization levels above the threshold value.

9. The computer program product of claim 8, further comprising:
validating underutilization status of each processor core of the sub-set of processor cores.

10. The computer program product of claim 8, further comprising:
selecting a target processor core from the set of active processor cores based on the target processor core having a utilization level above the threshold value, the target processor core being the processor core to which the DTCH request is to be routed; and
routing all further traffic for the DTCH request vis the target processor core.

11. The computer program product of claim 8, further comprising:
upon reallocating the logical channels from the underutilized processor cores, causing the underutilized processor cores to go into sleep mode.

12. The computer program product of claim 8, further comprising:
responsive to reallocating the logical channels to the set of active processor cores, monitoring workload levels and logical channels allocated to the active processor cores.

13. The computer program product of claim 8, wherein determining the logical channels allocated to the underutilized processor cores includes:
identifying user devices allocated logical channels to the underutilized processor cores via a user-device to DTCH map.

14. A computer system for resource management in a fifth generation (5G) network, the computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform resource management in a fifth generation (5G) network by:
monitoring a platform queue in a 5G network for a dedicated traffic channel (DTCH) request;
responsive to receipt of a DTCH request, identifying a plurality of processor cores of an evolved-universal-terrestrial-radio-access-network Node B (eNodeB) to which the DTCH request may be assigned;
determining a utilization level of each processor core;
identifying a sub-set of processor cores having utilization levels below a threshold value;
for each processor core identified as underutilized, determining logical channels allocated to the underutilized processor cores; and
reallocating the logical channels to a set of active processor cores of the plurality of processor cores, the set of active processor cores having utilization levels above the threshold value.

15. The computer system of claim 14, further comprising:
validating underutilization status of each processor core of the sub-set of processor cores.

16. The computer system of claim 14, further comprising:
selecting a target processor core from the set of active processor cores based on the target processor core having a utilization level above the threshold value, the target processor core being the processor core to which the DTCH request is to be routed; and
routing all further traffic for the DTCH request vis the target processor core.

17. The computer system of claim 14, further comprising:
upon reallocating the logical channels from the underutilized processor cores, causing the underutilized processor cores to go into sleep mode.

18. The computer system of claim 14, further comprising:
responsive to reallocating the logical channels to the set of active processor cores, monitoring workload levels and logical channels allocated to the active processor cores.

19. The computer system of claim 14, wherein determining the logical channels allocated to the underutilized processor cores includes:
identifying user devices allocated logical channels to the underutilized processor cores via a user-device to DTCH map.

20. The computer system of claim 14, wherein determining the utilization level includes:
collecting utilization levels of the plurality of processor cores for a specified operation timeframe; and
comparing the utilization levels of each processor core to identify an overall balancing among processor cores of the eNodeB; and
wherein the identifying a sub-set of processor cores is performed responsive to the overall balancing among the processor cores being outside a pre-defined tolerance.

* * * * *